United States Patent [19]

Gesser

[11] Patent Number: 4,547,350

[45] Date of Patent: Oct. 15, 1985

[54] ABATEMENT OF INDOOR POLLUTANTS

[76] Inventor: Hyman D. Gesser, 218 Girton Blvd., MB R3P 0A7 Winnipeg, Manitoba, Canada

[21] Appl. No.: 465,051

[22] Filed: Feb. 9, 1983

[51] Int. Cl.⁴ .................... B01D 47/00; C01B 21/00
[52] U.S. Cl. .................... 423/210; 423/245; 524/612; 525/540; 106/287.3
[58] Field of Search .......... 423/237, 240, 245 S, 423/210 R; 524/555, 606, 608, 612; 106/287.3, 287.29; 525/540

[56] References Cited

U.S. PATENT DOCUMENTS

| | | | |
|---|---|---|---|
| 3,898,038 | 5/1975 | Anderson | 423/245 S X |
| 3,911,080 | 10/1975 | Mehl et al. | 423/245 S X |
| 4,104,228 | 8/1978 | Meyer et al. | 524/608 |
| 4,110,292 | 8/1978 | Sekmakas et al. | 524/555 X |
| 4,254,003 | 3/1981 | Fox et al. | 524/555 |
| 4,321,240 | 3/1982 | Robinson | 423/245 S X |
| 4,374,814 | 2/1983 | Gaylord | 423/245 |
| 4,427,805 | 1/1984 | Kooijmans et al. | 524/608 X |
| 4,428,977 | 1/1984 | Peterson | 524/608 X |
| 4,429,066 | 1/1984 | Gilmer | 106/287.3 X |

*Primary Examiner*—Donald R. Valentine

[57] ABSTRACT

Indoor pollutants such as formaldehyde can be removed from a home reactive method consisting of a coating on a furnace filter in a forced air heating system. The coating is a polymeric substance with specific functional groups which react with the pollutant and which in the case of formaldehyde or other aldehydes such as acrolein or acetaldehyde would be a polymeric amine such as polyethylenimine.

10 Claims, No Drawings

ABATEMENT OF INDOOR POLLUTANTS

BACKGROUND OF THE INVENTION

This invention is related to a simple, new and useful method whereby some or all of a specific indoor pollutant can be removed.

Conventional methods usually involve the adsorption of such pollutants onto activated surfaces such as charcoal, silica gel, alumina or other materials with large surface areas, (see R. E. Goddard & J. A. Coles Canadian Pat. No. 625,216 and J. W. Kasmark Jr., M. L. Dooley & A. H. Jones U.S. Pat. No. 4,227,904.

Another conventional method is to use a solution to react with the specific gas, (see M. A. Kise, Canadian Pat. No. 643,062).

Such methods are usually non-specific and quite expensive to produce and operate. In the case where aqueous solutions are used the air becomes saturated with water and higher humidity levels result. In the case of adsorption systems, the pollutant, usually present in trace quantities, must compete with oxygen, nitrogen, carbon dioxide and water in the air in order to be adsorbed to a significant extent. The adsorption is also temperature dependent and not always complete as far as the pollutant is concerned.

SUMMARY OF THE INVENTION

The present invention describes a simple and efficient method of removing indoor pollutants by allowing them to react with a polymeric substance which contains specific functional groups which react with and form chemical bonds with the specific pollutant. Different functional groups can be used for different pollutants. Acidic carboxylic acid groups (—COOH) or sulfonic acid groups (—SO$_3$H) can remove basic gases such as ammonia, or amines, whereas basic groups such as amines can remove acidic gases such as hydrogen halides.

Since the polymer is non-volatile and of high molecular weight the product of the reaction between the pollutant and the functionalized polymer is a solid and the result is that the pollutant is removed from the air. The polymer, which can be coated onto an air filter, does not contribute gases to the air nor is its reactivity impaired by the presence of other gases. The use of two coated filters in series, each treated with different functionalized polymers could be used to remove different pollutants.

DESCRIPTION OF THE PREFERRED EMBODIMENT

I have shown that a typical pollutant such as formaldehyde, which may come from the decomposition of urea-formaldehyde foam insulation or from the resin used in plywood or particle board, can be removed by passing the air in the home through a fiber-glass filter coated with a thin layer of a polymeric amine such as polyethylenimine. Polyethylenimine is a water soluble polymer with primary and secondary amine functional groups which react with aldehydes as well as acidic gases.

Many homes use a forced air furnace as a means of supplying heat. Such furnaces heat air which is circulated through the home by means of a fan and which usually includes a filter to remove the dust and particulate matter in the home. By coating such a filter with the polymeric substance having suitable functional groups, it is possible to remove the pollutant from the air as it is circulated through the filter. Open cell polyurethane foam filters can also be treated in this manner. The coated filter must be replaced periodically, usually after about a month, more or less, depending on the concentration of the pollutant in the air, the size of the home, the size of the filter and the amount of polymeric coating applied.

EXAMPLE 1

The air in a two storey home was analyzed during a three month period and was shown to have formaldehyde levels of from 0.030 to 0.100 ppm due to the presence of urea-formaldehyde foam insulation. A fiber-glass filter, 20"×25"×1" was coated with about 6 grams of polyethylenimine. This was done by spraying the filter with about 150 mL of a 5% solution of the polymer in water and allowing the filter to dry. The filter was then installed in the furnace and the furnace fan run for one week. Analysis for formaldehyde in the air then gave undetectable levels, i.e. less than 0.001 ppm.

EXAMPLE 2

The air in a three storey split-level home was analyzed for formaldehyde and was shown to have levels of from 0.050 to 0.140 ppm due to the presence of urea-formaldehyde foam insulation. A fiber-glass filter 16"×20"×1" was treated with about 150 mL of a 5% solution of polyethylenimine and allowed to dry leaving about 6.5 grams of polymer on the filter. The filter was then installed in the furnace and the fan run. After one week the levels of formaldehyde in the air were shown to be 0.008, 0.000, 0.000 and 0.000 ppm.

Other polymeric amines and some hydrazines are equally effective in trapping aldehydes are polyvinylamine and polyethylene hydrazine though many more can be prepare. It is also possible for the functionalized polymer to be incorporated into a paint that is applied to the walls and ceilings of a home. The pollutants can diffuse through the outer layer of the paint and react with the polymer forming chemical bonds thereby being removed from the air. Aldehydes such as acrolein and acetaldehyde which are often present in homes (see Indoor Pollutants, National Academy Press, Washington, D.C. 1981) are also removed by polyethylenimine or the above polymeric amines and hydrazines.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A method of reducing the indoor air concentration of formaldehyde gas by coating a porous support filter with polyethyleneimine and passing the indoor air through said support filter.

2. A method according to claim 1 in which the polymer has hydrazine, —(NH—NH$_2$), functional groups.

3. A method according to claim 1 in which the polymer has primary amine functional groups.

4. A method according to claim 1 in which the polymer is coated onto a forced-air furnace filter and in which the operation of the furnace fan circulates the indoor air through said coated filter.

5. A method of reducing the indoor air concentration of formaldehyde gas by incorporating into a paint for use on walls and ceilings a water insoluble polymer which has free residual hydrazine functional group remaining in the resultant dry coating.

6. A method according to claim 5 in which the water insoluble polymer has primary amine functional groups.

7. A method according to claim 5 in which the water insoluble polymer has secondary amine functional groups.

8. A method of reducing the indoor air concentration of aldehydes by allowing the air containing the aldehyde to come into contact with polymers which have free residual hydrazine functional groups.

9. A method according to claim 8 in which the polymer has free residual primary amine functional groups.

10. A method according to claim 8 in which the polymer has free residual secondary amine functional groups.

* * * * *